(12) United States Patent
Schmieder et al.

(10) Patent No.: US 9,135,154 B2
(45) Date of Patent: Sep. 15, 2015

(54) ALGORITHM EXECUTION OUTPUT CACHE

(75) Inventors: Wilhelm R. Schmieder, Snoqualmie, WA (US); Somesh Goel, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 12/845,529

(22) Filed: Jul. 28, 2010

(65) Prior Publication Data

US 2011/0219058 A1  Sep. 8, 2011

Related U.S. Application Data

(60) Provisional application No. 61/275,700, filed on Mar. 2, 2010.

(51) Int. Cl.
*G06F 15/16* (2006.01)
*G06F 12/00* (2006.01)

(52) U.S. Cl.
CPC ............... *G06F 12/00* (2013.01); *G06F 15/16* (2013.01)

(58) Field of Classification Search
USPC ........................................ 709/203, 217, 247
See application file for complete search history.

(56) References Cited

U.S. PATENT DOCUMENTS

| 6,611,876 | B1 | 8/2003 | Barrett et al. | |
|---|---|---|---|---|
| 6,836,841 | B1 | 12/2004 | Wu et al. | |
| 7,389,330 | B2 * | 6/2008 | Dillon et al. | 709/219 |
| 7,610,263 | B2 | 10/2009 | Dettinger et al. | |
| 7,986,844 | B2 * | 7/2011 | Diamant et al. | 382/232 |
| 2009/0271527 | A1 * | 10/2009 | Appelman | 709/247 |
| 2009/0300038 | A1 | 12/2009 | Chen et al. | |
| 2010/0268694 | A1 * | 10/2010 | Denoue et al. | 707/693 |
| 2010/0293248 | A1 * | 11/2010 | Kamay et al. | 709/219 |

FOREIGN PATENT DOCUMENTS

CN           101523360 A      9/2009

OTHER PUBLICATIONS

Chen et al., "Performance Enhancement by Eliminating Redundant Function Execution", Proceedings of the 39th Annual Simulation Symposium (ANSS'06), Huntsville, Alabama, Apr. 2-6, 2006, 8 pages.

(Continued)

*Primary Examiner* — Bryan Lee
(74) *Attorney, Agent, or Firm* — Kate Drakos; Bryan Webster; Micky Minhas (57) ABSTRACT

Techniques are disclosed for algorithm execution output cache. A remote presentation session server conducting concurrent remote presentation sessions with a plurality of clients generates a signature for each image that it is to send to a client. The remote presentation server also maintains a signature table comprising pairs of signatures and compressed images. Each signature and compressed image pair corresponds to input data (i.e. the signature was generated from an image and the compressed image was generated from that same image). The remote presentation session server checks the signature against the signature table. Where the remote presentation session server determines that there is a match between the signature and a signature in the signature table, it sends the client the compressed image that corresponds to the signature in the signature table that generated the match. In doing so, the remote presentation session server may avoid redundantly compressing the second image.

16 Claims, 4 Drawing Sheets

(56) References Cited

OTHER PUBLICATIONS

Ding et al., "A Compiler Scheme for Reusing Intermediate Computation Results", Proceedings of the International Symposium on Code Generation and Optimization (CGO 2004), Mar. 20-24, 2004, 12 pages.

Kavi et al., "Dynamic Function Result Reuse", Proceedings of the 11$^{th}$ International Conference on Advanced Computing (ADCOM-2003), Coimbatore, Mar. 9, 2007, 10 pages.

Kumar, "Value Reuse Optimization: Reuse of Evaluated Math Library Function Calls through Compiler Generated Cache", ACM SIGPLAN Notices, Aug. 2003, 38(8), 7 pages.

Popa et al., "DryadInc: Reusing Work in Large-Scale Computations", Proceedings of the 2009 conference on Hot topics in cloud computing, San Diego, California, retrieved Dec. 30, 2009, 5 pages.

V et al., "Dynamic Trace-Level Reuse across Multiple Executions", retrieved Dec. 30, 2009, 4 pages.

\* cited by examiner

ALGORITHM EXECUTION OUTPUT CACHE

CROSS-REFERENCE TO RELATED APPLICATIONS

This application claims benefit under 35 U.S.C. §119(e) of provisional U.S. patent application No. 61/275,700, filed Mar. 2, 2010, the contents of which is incorporated herein by reference in its entirety.

BACKGROUND

Although computers were once isolated and had minimal or little interaction with other computers, computers now interact with a wide variety of other computers through Local Area Networks (LANs), Wide Area Networks (WANs), dial-up connections, and the like. With the wide-spread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is executing the applications locally, when in reality the client device is only sent screenshots of the applications as they appear on the server side.

A remote presentation session server may conduct concurrent remote presentation sessions with a plurality of clients. These plurality of clients may be each sent the same data. For instance, where a plurality of the client sessions are to display an identical screen saver (e.g. black with a static logo). To send this image data to each client requires the server to independently encode the image data for each client session, resulting in a use of server processing resources to perform a redundant task.

SUMMARY

It would, therefore, be an improvement to reduce the amount of redundant use of processing resources of a server. A remote presentation session server conducting concurrent remote presentation sessions with a plurality of clients generates a signature for each image that it is to send to a client. The remote presentation server also maintains a signature table comprising pairs of signatures and compressed images. Each signature and compressed image pair corresponds to one image. That is, the signature was generated from an image and the compressed image was generated from that same image. The remote presentation session server checks the signature against the signature table. Where the remote presentation session server determines that there is a match between the signature and a signature in the signature table, it sends the client the compressed image that corresponds to the signature in the signature table that generated the match. In doing so, the remote presentation session server may avoid redundantly compressing the image.

Where the remote presentation session server determines that there is no match between the signature and a signature in the signature table, it compresses the image, and stores a pair comprising the signature and the resulting compressed image in the signature table. In doing so, the remote presentation session server may avoid performing redundant work in the future if it encounters that image again. The remote presentation session server sends the client the compressed image.

While the primary embodiment disclosed herein makes reference to applying these techniques to images to be sent across concurrent remote presentation sessions, it may be appreciated by one skilled in the art that these techniques may be applied more broadly to scenarios where a server is sending data that must be processed before sending to a plurality of clients, whether those client sessions are concurrent or not. It may be further be appreciated that the techniques may also be applied to a more general scenario where possibly identical data is being processed by a plurality of components on a computing device, and the output of processing that data may be signed, and accessed by the plurality of components.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for an algorithm execution output cache are further described with reference to the accompanying drawings in which.

DETAILED DESCRIPTION OF ILLUSTRATIVE EMBODIMENTS

Figure 1:
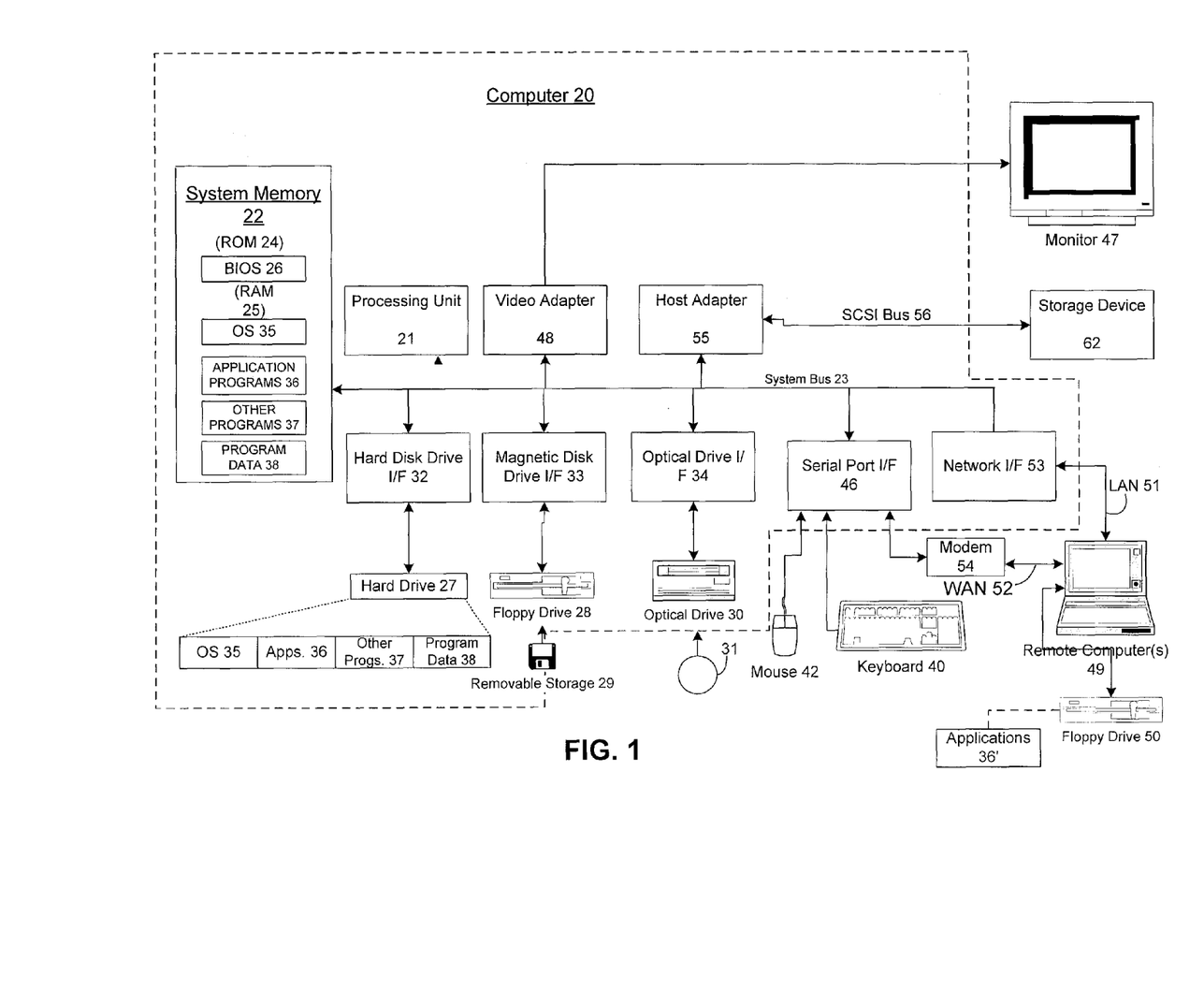
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 22 includes computer-readable storage media in the form of volatile and/or nonvolatile memory such as read only memory (ROM) 24 and random access memory (RAM) 25. A basic input/output system 26 (BIOS), containing the basic routines that help to transfer information between elements within computer 141, such as during start-up, is typically stored in ROM 24. RAM 25 typically contains data and/or program modules that are immediately accessible to and/or presently being operated on by processing unit 21. By way of example, and not limitation, FIG. 1 illustrates operating system 35, application programs 36, other program modules 37, and program data 38.

The computer 141 may also include other removable/non-removable, volatile/nonvolatile computer storage media. By way of example only, FIG. 1 illustrates a hard disk drive 27 that reads from or writes to non-removable, nonvolatile magnetic media, a magnetic disk drive 28 that reads from or writes to a removable, nonvolatile magnetic disk 29, and an optical disk drive 30 that reads from or writes to a removable, nonvolatile optical disk 31 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 27 is typically connected to the system bus 23 through an non-removable memory interface such as interface 32, and magnetic disk drive 28 and optical disk drive 30 are typically connected to the system bus 23 by a removable memory interface, such as interfaces 33 and 34.

The drives and their associated computer storage media discussed above and illustrated in FIG. 1, provide storage of computer-readable instructions, data structures, program modules and other data for the computer 141. In FIG. 1, for example, hard disk drive 27 is illustrated as storing operating system 35, application programs 36, other program modules 37, and program data 38. Note that these components can either be the same as or different from operating system 35, application programs 36, other program modules 37, and program data 38 depicted in RAM 25. At a minimum, they are different copies. A user may enter commands and information into the computer 141 through input devices such as a keyboard 40 and pointing device 42, commonly referred to as a mouse, trackball or touch pad. Other input devices (not shown) may include a microphone, joystick, game pad, satellite dish, scanner, or the like. These and other input devices are often connected to the processing unit 21 through a user input interface 46 that is coupled to the system bus, but may be connected by other interface and bus structures, such as a parallel port, game port or a universal serial bus (USB). A monitor 47 or other type of display device is also connected to the system bus 23 via an interface, such as a video interface 48. In addition to the monitor, computers may also include other peripheral output devices such as speakers and printer, which may be connected through a output peripheral interface 46.

The computer 141 may operate in a networked environment using logical connections to one or more remote computers, such as a remote computer 49. The remote computer 49 may be a personal computer, a server, a router, a network PC, a peer device or other common network node, and typically includes many or all of the elements described above relative to the computer 141, although only a memory storage device 50 has been illustrated in FIG. 1, which has stored on media thereon applications 36'. The logical connections depicted in FIG. 1 include a local area network (LAN) 51 and a wide area network (WAN) 52, but may also include other networks. Such networking environments are commonplace in offices, enterprise-wide computer networks, intranets and the Internet.

When used in a LAN networking environment, the computer 141 is connected to the LAN 51 through a network interface or adapter 53. When used in a WAN networking environment, the computer 141 typically includes a modem 54 or other means for establishing communications over the WAN 52, such as the Internet. The modem 54, which may be internal or external, may be connected to the system bus 23 via the user input interface 46, or other appropriate mechanism. In a networked environment, program modules depicted relative to the computer 141, or portions thereof, may be stored in the remote memory storage device. By way of example, and not limitation, FIG. 1 illustrates remote application programs 36' as residing on memory device 50. It will be appreciated that the network connections shown are exemplary and other means of establishing a communications link between the computers may be used.

Computer 141 may also have a host adapter 55, which connects to a storage device 62 via SCSI bus 56.

Figure 2:
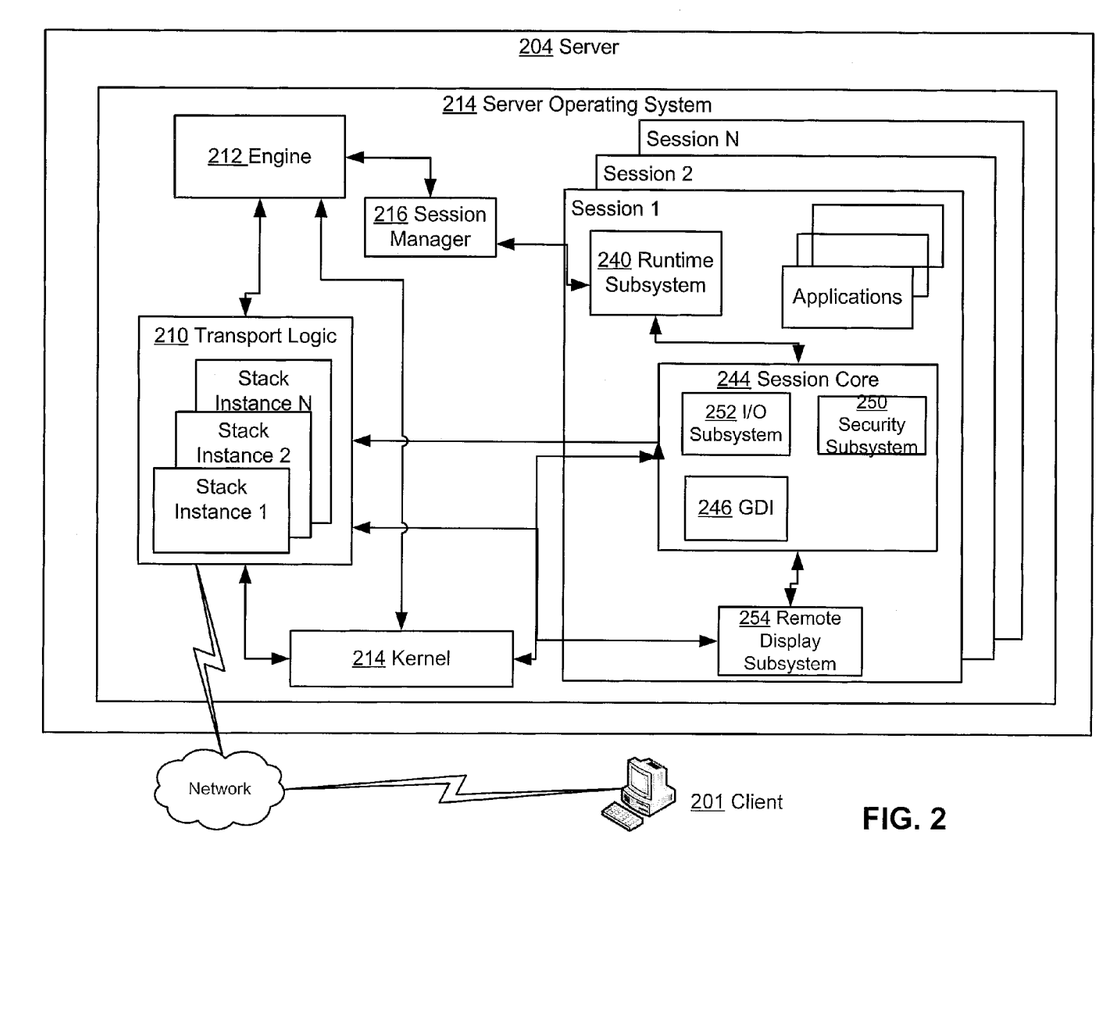
FIG. 2 depicts an example remote presentation session server wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures depicted by FIG. 3.

Generally, FIG. 2 depicts a high level overview of a server environment that can be configured to include aspects of the present disclosure. In reference to the figure, depicted is a server 204 that can include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
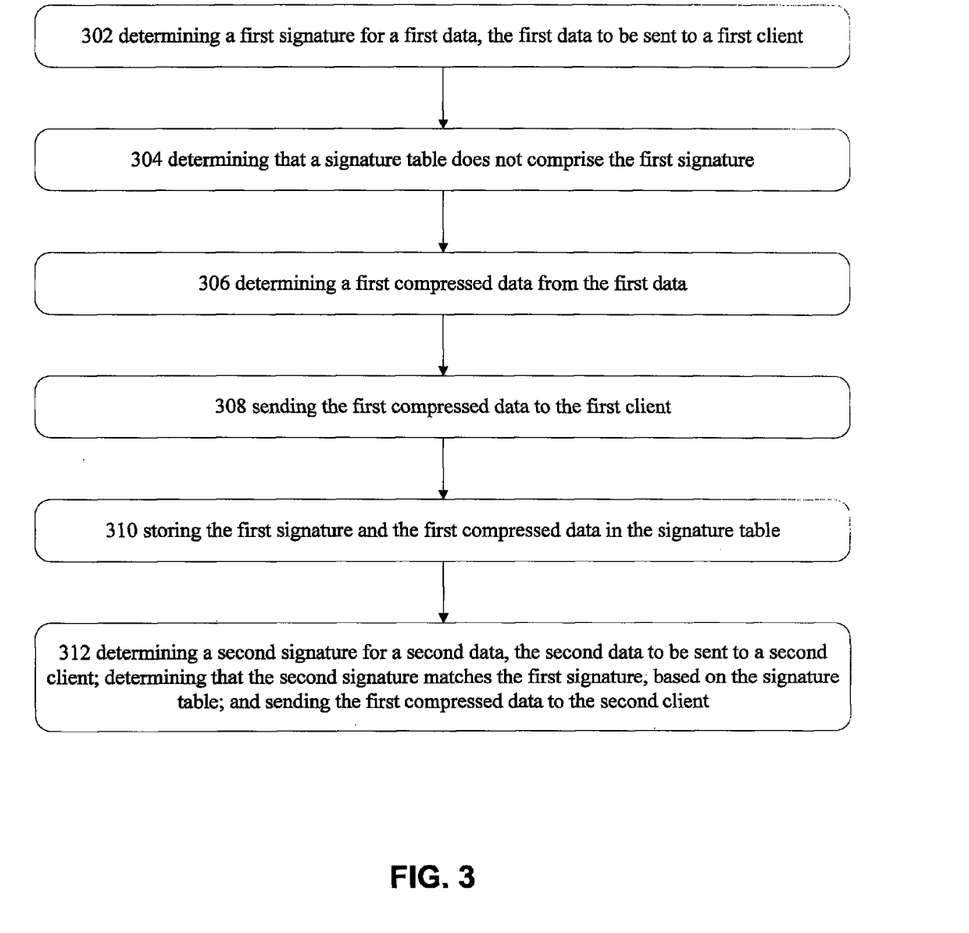
FIG. 3 illustrates example operational procedures for an algorithm execution output cache.

FIG. 3 depicts example operational procedures for an algorithm execution output cache. The operational procedures disclosed herein are directed to an remote presentation session embodiment, but it may be appreciated that they may be applied to other scenarios, as discussed in the Summary.

Operation 302 depicts determining a first signature for a first data, the first data to be sent to a first client. The first data may comprise a first data set. In an embodiment, the first data comprises an image. The first data may comprise an image such as in the course of a remote presentation session. Where a remote presentation session server is sending data to a client across a remote presentation session, some of that data comprises images—frames to be sent to the client. Further, the remote presentation session server may subdivide a frame into a plurality of tiles (such as to improve client-side caching—if the client has already been sent a tile, and has stored it, in lieu of sending the client the tile again when it is encountered, bandwidth may be saved by sending the client an indication to display the tile that it has cached). In an embodiment, the first data comprises a tile in a remote presentation session.

In an embodiment, the first data may comprise data compressed with a history-based compressor. That is, data element n may be compressed with an operation, or an algorithm, that takes as input data element n and the result of compressing data element n−1 with the same operation (for data element n−1, the operation in turn takes as input data element n−1 and the result of compressing data element n−2 with the same operation or process, and so forth).

In an embodiment wherein a signature table (which comprises a table that stores pairs of the first data and its corresponding signature in a memory location, such as a memory address of RAM 25 of FIG. 1, as discussed in greater detail, below) comprises a hash table, determining the first signature for the first data comprises performing a hash function on the first data. The output of the hash function may then be treated as the first signature and inserted into the hash table, as a key to the first data.

In an embodiment, operation 302 further comprises determining that the first signature collides with a second signature of the signature table, the second signature corresponding to a second compressed data; and replacing the second compressed data with the first compressed data. Where a signature comprises fewer bits than the data it corresponds to, then one signature must correspond to multiple data members. Given that, there is the possibility of collisions within the signature table—cases where two different compressed data are to be stored, wherein those two different compressed data share the same signature.

In such a case, as stated above, a most recently used (MRU) algorithm may be implemented where the newly used data (the above first compressed data) replaces the older data (the above second compressed data) in the signature table.

Operation 304 depicts determining that a signature table does not comprise the first signature. Where the first data has not been previously compressed, then the first signature will not have been stored within the signature table. So, if the first signature is not stored in the signature table, then it may be determined that the first data has not been previously compressed, so there is no cached first compressed data, and the first data is to be presently compressed before sending it to the client.

Operation 306 depicts determining a first compressed data from the first data. This can be determined, such as by performing a Joint Photographic Experts Group (JPEG) compression on the first data to produce a corresponding first compressed data.

Operation 308 depicts sending the first compressed data to the first client. This may be done, such as via a remote presentation session protocol across a communications network, such as the INTERNET™.

Operation 310 depicts storing the first signature and the first compressed data in the signature table. In an embodiment wherein the signature table comprises a hash table, the first signature may comprise the key and the first compressed data may comprise the data stored in the bucket corresponding to the key. A pair may be stored comprising the result of processing the first data with the first algorithm or process and the first signature.

While those skilled in the art will appreciate that this operational procedures do not imply a strict order of operation, and various permutations of such may be used to implement the present techniques, the present operation may be discussed to provide an example. For instance, the present techniques may function should operation 310 (server-side caching) occur before operation 308 (sending the compressed data to the client).

Operation 312 depicts determining a second signature for a second data, the second data to be sent to a second client; determining that the second signature matches the first signature, based on the signature table; and sending the first compressed data to the second client. Having cached the first compressed data, when new data is encountered matching the first data, that new data does not need to be compressed, but the first compressed data may be retrieved from the signature table, saving computational resources.

For instance, a second data may be received that is to be sent to a second client in which a remote presentation session is being conducted. In an embodiment where the first data was originated by a first remote presentation session process, the second data may be originated by a second remote presentation session process. Through the present techniques, these two processes may share identical output from a remote presentation session tiling process that takes an image to be compressed as input and produces from it an output comprising one or more tiles (possibly compressed) to send to a client in a remote presentation session.

Those tiles may then be cached on the client-side between the first remote presentation session process and its corresponding client, reducing the bandwidth required to effect that remote presentation session. Where the first remote presentation session process determines that the client has already been sent a particular tile (and thus has it stored in a client-side cache), instead of sending the tile again, it may send to the client an indication to fetch that particular tile from its cache (the indication requiring less bandwidth to transmit than the tile, this technique reduces bandwidth usage).

Returning to discussing this received second data, a second signature is determined for this second data, and then the second signature may be checked against the signature table. In this operation, it is determined that the second signature matches the first signature, which is already stored in the signature table. This may be accomplished, for instance, in the embodiment where the signature table comprises a hash table, by using the second signature as a key to the signature table and determining that data (here, the first compressed data) exists in the corresponding bucket.

Since the first signature and the second signature match, that indicates that the first data and the second data match, and that, if a second compressed data were determined from the second data, it would match the first compressed data. So, the work of producing a second compressed data from the second data may be avoided, and the first compressed data (which would match a second compressed data) used, and sent to the second client. In this way, the caching of compressed data may span a plurality of remote presentation sessions conducted by a server.

In an embodiment, upon determining that the second signature matches the first signature, a check may be made to ensure that the first compressed data would match a second compressed data, and that this match of signatures is not merely the result of a collision (in the hash table embodiment).

In an embodiment, this includes, based on determining that the second signature matches the first signature, processing the result of processing the first data with the first operation (or algorithm) with a second operation (or algorithm). For instance, in a remote presentation session context, the first operation may be a tiling operation that takes images to be sent in the session as input, and produces a first data set comprising compressed tiles of those images (or just one such compressed tile). The second operation may then be an operation that transfers the compressed tiles to the client of the remote presentation session. Where the first signature matches the second signature, it may be determined that the result of processing the first data set with the first operation would match the result of processing the second data set with the first operation (in this embodiment, the second data set need not be processed with the first operation, since the first signature matches the second signature).

Then, this first data set may be processed with the second operation and stored in a memory location, such as an address of RAM 25 of FIG. 1, communicatively coupled to a computing device's CPU, before being sent to the client in the present remote presentation session.

Figure 4A:
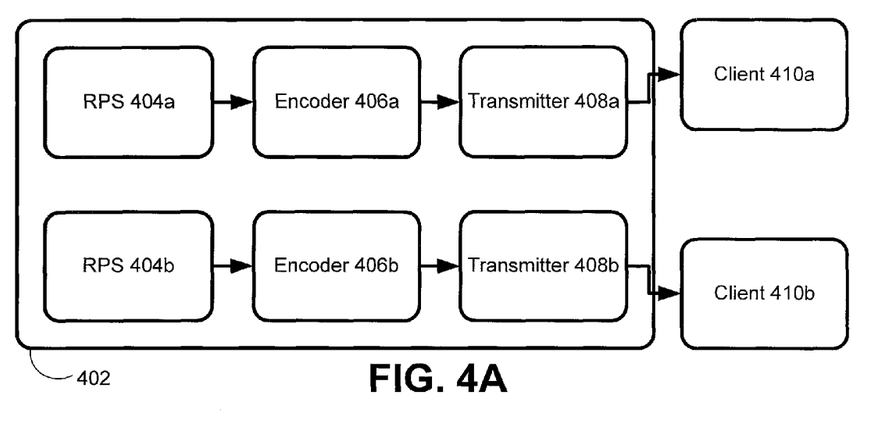
FIG. 4A depicts a plurality of remote presentation session processes on a server operating without use of an algorithm execution output cache.

FIG. 4A depicts a plurality of remote presentation session processes on a server operating without use of an algorithm execution output cache. It may be appreciated that the elements of FIGS. 4A and 4B are displayed logically, and do not necessarily connote that each separate element must be a separate element or component of a the server.

Server 402 comprises remote presentation session process 404a, image encoder 406a, remote presentation session transmitter 408a, presentation session process 404b, image encoder 406b, remote presentation session transmitter 408b, Remote presentation session process 404a conducts a remote presentation session with client computing device 410a, and remote presentation session process 404b conducts a remote presentation session with client computing device 410b. Each of server 402, and client computing devices 410a and 410b may comprise computing device 141 of FIG. 1.

Remote presentation session processes 404a and 404b may be sending their respective clients 410a and 410b the exact same images (for instance, an entirely black screen, or a default desktop configuration showing a default wallpaper), but both encoder 406a and encoder 406b must separately encode these images because they each lack a way to leverage the processing that the other may have already performed. This lack of ability to share between the encoders results in the use of server processing resources to perform redundant work.

Figure 4B:
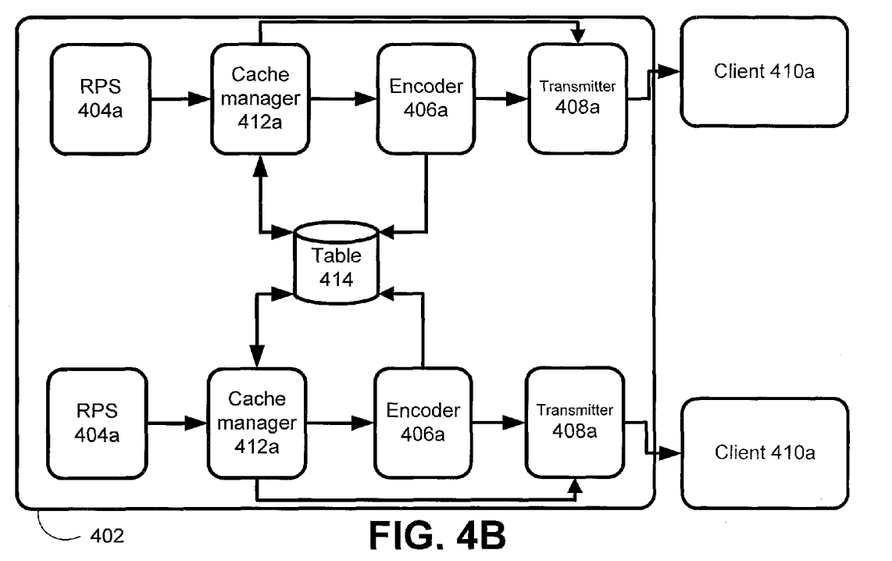
FIG. 4B depicts a plurality of remote presentation session processes on a server operating with use of an algorithm execution output cache.

FIG. 4B depicts a plurality of remote presentation session processes on a server operating with use of an algorithm execution output cache.

Here, when remote presentation session process 404a sends an image to encoder 406a to be encoded, it is first processed by cache manager 412a. Cache manager 412a takes a signature of the image, then checks the signature against signature table 414. If there is a match, cache manager 414a retrieves an encoded image from signature table 414 that corresponds to the signature. This retrieved encoded image is what the output of encoder 406a would be if given the image as input. Since the output of encoder 406a is known for this image without using the processor resources to encode the image, this encoded image may be sent by cache manager 412a to remote presentation session transmitter 408a, where it is transmitted to client 410a. Doing this saves on the use of processor resources.

It should be observed that the data flow described is illustrative and that other embodiments may be appreciated by one of skill in the art. For instance, cache manager 412a need not retrieve the encoded image from signature table 414 and then send it to remote presentation session transmitter 408a itself, but in an embodiment, may instruct a process associated with signature table 414 to send the encoded image to remote presentation session transmitter 408a directly.

Where there is no match for the signature in the signature table, the image may be then sent to encoder 406a to produce an encoded image. The signature produced by cache manager 412a and the encoded image produced by encoder 406a may then be stored in signature table 414, so that when a match for this signature is found in the future from a new image, processing resources may be saved by fetching the corresponding encoded image from signature table 414. Encoder 406a may also send the encoded image to remote presentation session transmitter 408a, which in turn sends it to client 410a according to a remote presentation session protocol.

Remote presentation session process 404b operates similar to remote presentation session process 404a. Since both remote presentation session process 404a and remote presentation session process 404b share signature table 414, where an image is encoded by either encoder 406a or 406b, that encoded image is available to the flow of both remote presentation session process 404a and remote presentation session process 404b. Through this sharing of signature table 414, redundant encoding is avoided as between served remote presentation sessions.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for caching data among a plurality of remote presentation sessions hosted by a server, comprising:
   generating a first frame of graphics data for a first client in a first user session on the server that the server uses to conduct a first remote presentation session, the first frame comprising a first plurality of image tiles;
   determining a first signature for a first tile of the first plurality of tiles;

determining that a signature table does not comprise the first signature;

compressing the first tile into a first compressed tile;

sending the first compressed tile to the first client in the first remote presentation session;

generating a second frame of graphics data for a second client in a second user session on the server that the server uses to conduct a second remote presentation session, the second frame comprising a second plurality of image tiles, the second frame of graphics data differing from the first frame of graphics data;

determining a second signature for a second tile of the second plurality of tiles, the second tile being in a different location within the second frame than the location of the first tile within the first frame;

determining that the second signature matches the first signature; and sending the first compressed tile to the second client in the second remote presentation session.

2. The method of claim 1, further comprising:
storing the first signature and the first compressed tile in the signature table.

3. The method of claim 1, wherein determining the first signature for the first tile comprises performing a hash function on the first tile.

4. The method of claim 3, further comprising:
determining that the first signature collides with a second signature of the signature table, the second signature corresponding to a second compressed tile; and
replacing the second compressed tile with the first compressed tile.

5. The method of claim 1, further comprising:
determining a third signature for a third tile, the third tile to be sent to the second client;
determining that the signature table does not comprise the third signature;
determining a third compressed tile from the third tile; and
sending the third compressed tile to the second client.

6. The method of claim 1, further comprising:
storing the signature table in nonvolatile memory.

7. A system, comprising:
a memory bearing instructions that, upon execution by a processor, cause the system to at least:
generate a first frame of graphics data for a first client in a first user session on the system that the system uses to conduct a first remote presentation session, the first frame comprising a first plurality of image tiles;
determine a first signature for a first tile of the first plurality of tiles;
determine that a signature table does not comprise the first signature;
compress the first tile into a first compressed tile;
send the first compressed tile to the first client in the first remote presentation session;
generate a second frame of graphics data for a second client in a second user session on the system that the system uses to conduct a second remote presentation session, the second frame comprising a second plurality of image tiles;
determine a second signature for a second tile of the second plurality of tiles, the second tile being in a different location within the second frame than the location of the first tile within the first frame;
determine that the second signature matches the first signature; and
send the first compressed tile to the second client in the second remote presentation session.

8. The system of claim 7, further bearing instructions that, upon execution by a processor, cause the system to at least:
store the first signature and the first tile in the signature table.

9. The system of claim 7, further bearing instructions that, upon execution by a processor, cause the system to at least:
store storing the signature table in nonvolatile memory.

10. The system of claim 7, wherein the signature table comprises a hash table, and determining the first signature for the first tile comprises performing a hash function on the first tile.

11. The system of claim 7, further bearing instructions that, upon execution by a processor, cause the system to at least:
determine that the first signature collides with a second signature of the signature table, the second signature corresponding to a second compressed tile; and
replace the second compressed tile with the first compressed tile.

12. A computer-readable storage device bearing computer-readable instructions that, upon execution on a computer, cause the computer to perform operations comprising:
generating a first frame of graphics data for a first client in a first user session on the computer that the computer uses to conduct a first remote presentation session, the first frame comprising a first plurality of image tiles;
determining a first signature for a first tile of the first plurality of tiles;
determining that a signature table does not comprise the first signature;
compressing the first tile into a first compressed tile;
sending the first compressed tile to the first client in the first remote presentation session;
generating a second frame of graphics data for a second client in a second user session on the computer that the computer uses to conduct a second remote presentation session, the second frame comprising a second plurality of image tiles;
determining a second signature for a second tile of the second plurality of tiles, the second tile being in a different location within the second frame than the location of the first tile within the first frame;
determining that the second signature matches the first signature; and
sending the first compressed tile to the second client in the second remote presentation session.

13. The computer-readable storage device of claim 12, further bearing computer-readable instructions that, upon execution on the computer, cause the computer to perform operations comprising:
storing the first signature and the first tile in the signature table.

14. The computer-readable storage device of claim 12, further bearing computer-readable instructions that, upon execution on the computer, cause the computer to perform operations comprising:
storing the signature table in nonvolatile memory.

15. The computer-readable storage device of claim 12, wherein the signature table comprises a hash table, and determining the first signature for the first tile comprises performing a hash function on the first tile.

16. The computer-readable storage device of claim 15, further bearing computer-readable instructions that, upon execution on the computer, cause the computer to perform operations comprising:
determining that the first signature collides with a second signature of the signature table, the second signature corresponding to a second compressed tile; and
replacing the second compressed tile with the first compressed tile.

* * * * *